Oct. 14, 1952 — L. E. DERUETTE — 2,613,690
FLUSH VALVE
Filed April 11, 1947
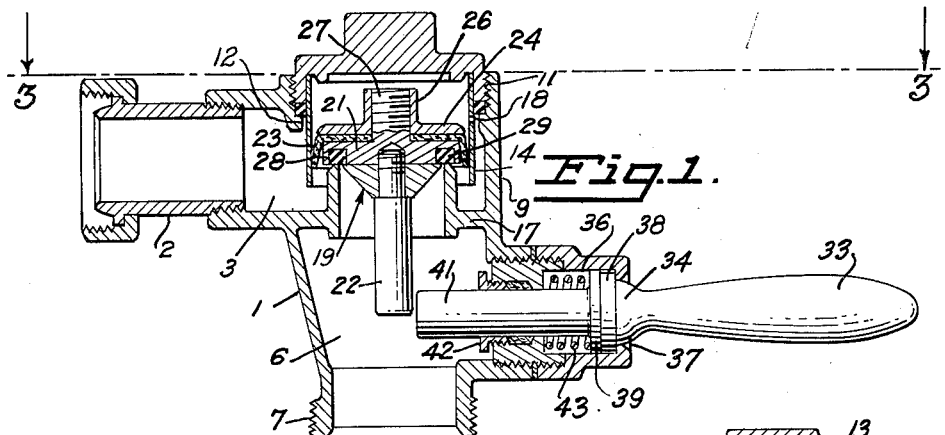
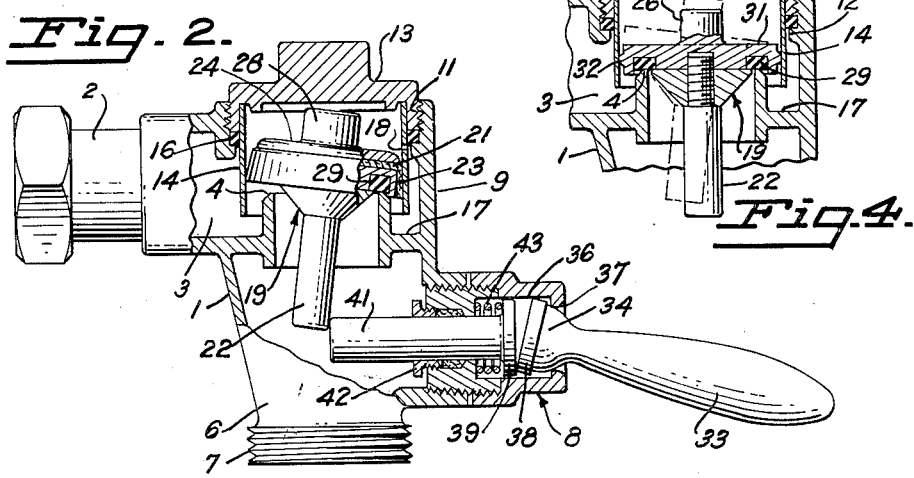
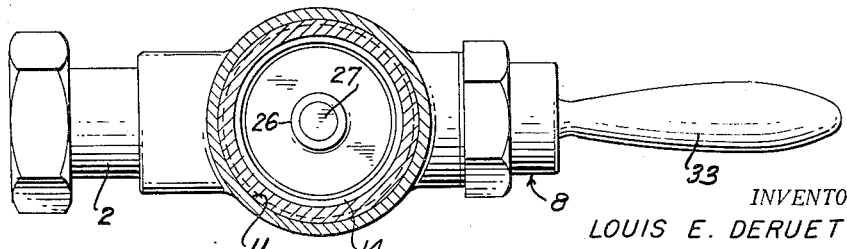
INVENTOR.
LOUIS E. DERUETTE
BY George B. White
ATTORNEY Patented Oct. 14, 1952

2,613,690

UNITED STATES PATENT OFFICE 2,613,690

FLUSH VALVE

Louis E. Deruette, San Francisco, Calif.

Application April 11, 1947, Serial No. 740,894

2 Claims. (Cl. 137—679)

This invention relates to flush valves.

In flush valves used in the past, an auxiliary relief valve was utilized for the purpose of reducing head pressure above a piston valve which latter constituted the main valve control for flushing. Various other controls, regulators and structures were provided in complicated combinations for the purpose of control. One of the problems presented by these prior structures and flush valves was the sticking of such valves, as well as so called hammer action in the water line when the valve became coated with impurities in the water or when packings or seals hardened. Particularly disadvantageous was the use of such double valve controls in connection with salt water aboard ships and the like. The impurities in salt water coat the valves and the packings and cause the same to stick, thereby preventing the complete closing of the valve and resulting in waste of water by continued flow of water through the flush valves after its operating parts are released. Also the closing of the valve became difficult. The operation of the various piston type and diaphragm valves frequently became slow and stuck before completely closing the valves, and resulted in the aforementioned hammer action. Leaking is quite common in connection with valves of the types heretofore used. The labor and materials involved in repairing such valves of prior types were excessive and frequently prohibitive.

The primary object of this invention is to provide a flush valve in which the relief valve and the use of two valves for control is entirely eliminated and which will close easier yet be cushioned so as to prevent hammer action and the sticking of the valve open, and positively obviates leaking; it is another advantage that there is only a single moving part in the valve which seats and cleans itself, and which can be readily replaced and repaired without undue expense of material and labor.

I am aware that some changes may be made in the general arrangements and combinations of the several devices and parts, as well as in the details of the construction thereof without departing from the scope of the present invention as set forth in the following specification, and as defined in the following claims; hence I do not limit my invention to the exact arrangements and combinations of the said device and parts as described in the said specification, nor do I confine myself to the exact details of the construction of the said parts as illustrated in the accompanying drawings.

With the foregoing and other objects in view, which will be made manifest in the following detailed description, reference is had to the accompanying drawings for the illustrative embodiment of the invention, wherein:

Fig. 1 is a sectional view of my flush valve in closed position.

Fig. 2 is a fragmental sectional view of my flush valve in open position.

Fig. 3 is a sectional plan view of my flush valve the section being taken on lines 3—3 of Fig. 1.

Fig. 4 is a sectional fragmental view of a modified form of my flush valve.

In the illustrative embodiment of the invention a usual flush valve body 1 has an intake connection 2 with an intake passage 3 leading to a valve seat 4. Below the valve seat 4 and axially aligned with the same is the outlet 6 which is adapted to receive a suitable coupling for the flush connection not shown. In the present form the outlet 6 is externally threaded at 7 so as to receive a coupling nut for the flush connection. At right angles to the outlet 6 and at one side of the valve body 1 is provided the usual operating or tripping mechanism denoted in its entirety by the numeral 8.

The valve seat 4 may be made integral with the valve body 1 as shown, or it may be a separate tubular member inserted in place. Around and above the valve seat 4 is formed an intake chamber 9 in communication with the intake passage 3. The upper end of the intake chamber 9 is internally threaded at 11 and at the inner end of said thread is formed an inwardly projecting shoulder 12. A nut 13 is screwed into the threaded end 11 of the valve chamber to close the same at the top.

The essential parts of my invention include a tubular sleeve 14 which has on its outer periphery a packing ring 16 resting upon the shoulder 12. This packing ring 16 is engaged at the top by the nut 13 and it performs the function of holding the sleeve in place as well as sealing the top of the intake chamber. The nut 13 has its threaded portion formed as a flange so that its inner periphery provides a recess into which the upper end of the sleeve 14 extends. The height of the sleeve 14 is such that its upper end extends beyond the packing ring 16 into the recess of the nut 13 while its lower end extends downwardly from the packing ring 16 to a point spaced above the bottom 17 of the intake chamber around the valve seat 4.

In the form of the invention illustrated in Figs. 1 and 2 a small hole 18 is provided through the sleeve 14 at a point immediately below the packing ring 16 to allow slow passage of water from the valve chamber into the upper portion of the sleeve 14.

A poppet valve 19 has its head 21 adapted to seat by gravity upon the valve seat 4. The stem 22 of the poppet valve 19 extends downwardly through the valve seat 4 toward the outlet 6 and oppositely to the operating mechanism 8. The head 21 of the poppet valve 19 is adapted on its outer periphery to engage the inner periphery of the sleeve when it is seated on the valve 4 and it is also adapted to so sit upon the valve seat 4 as to prevent the passage of water from the valve chamber to the outlet.

In the form shown in Figs. 1 and 2 the head 21 of the poppet valve has an inverted sealing cup 23 around its sides and its top which is clamped down and held in place by a cover plate 24 the hub 26 of which is threaded upon a threaded stub shaft 27 extended upwardly from the head 21 of the poppet valve. In this manner the sealing cup, which is made of a suitable composition material, is clamped in place. The underside of the valve head has in it an annular recess 28 in which is tightly held a suitable composition packing ring 29 which rests upon the edge of the valve seat 4.

In the form of the poppet valve shown in Fig. 4 the sealing cup is eliminated and the poppet head 31 has around its outer periphery an annular rib 32 which is of such diameter that it leaves a minute clearance, for instance .002 inch, to allow slow passage of water from the intake chamber to above the head of the poppet valve. The under face of this poppet valve 31 is also provided with the composition packing ring, heretofore described, to seal and seat upon the edge of the valve seat 4. When this form is used it is not necessary to have the small hole above the poppet valve through the sides of the sleeve, because the minute clearance around the periphery of the rib 32 allows slow equalization of water pressure between the intake chamber and the space in the sleeve above the poppet valve head 31. This form is particularly adapted to be used where impurities in the water, such as in salt water, have to be broken away from between the outer periphery of the valve and the sleeve. The metal to metal contact in this form, on each actuation grinds or breaks away any accumulation of impurities around the periphery and the valve clears itself, so that any sticking of the valve is positively prevented. This poppet valve 31 is cushioned, but for better cushioning, especially in use on land and for more silent operation the poppet with the sealing cup, shown in Figs. 1 and 2, is preferable.

Both forms of valves are operated by the usual operating device 8 which includes a handle 33 which has a semi-spherical end 34 rotatable and tiltable in a socket 36 formed on and extended from one side of the valve body 1. A hole 37 is provided to allow the movement of the handle 33 for shifting its end 34. On the semi-spherical end 34 is a flange or disc 38 which is adapted to engage face to face the disc head 39 of an operating stem 41, as shown in Fig. 1. A packing gland 42 is threaded into the inside enlarged end of the socket so that the stem 41 reciprocates in the packing gland. A coil spring 43 around the packing stem 41 bears at one end against the packing gland 42 and at its other end against the underside of the disc head 39 so as to normally urge the operating stem 41 outwardly of the valve body 1 and away from the valve stem 22 as shown in Fig. 1.

In operation the handle 33 is depressed from the position shown in Fig. 1 to the position shown in Fig. 2, whereupon by reason of the tilting of the disc 38 on its semi-spherical end 34 the disc head 39 and the stem 41 are pressed inwardly compressing the spring 43. When so moved the stem 41 engages the lower end of the valve stem 22, as shown in Fig. 2, and tilts the valve head 21 so as to allow water from the intake passage 3 to flow around and under the sleeve 14 and out through the opening of the valve seat 4. When the handle 33 is released the spring 43 pushes the cam head 39 back and straightens out the handle 33, and at the same time it withdraws the stem 41 from the valve stem 22. The valve 21 then drops down by its own weight. Also the suction created by the flow through the valve tends to "pull" the valve head 21 onto the valve seat. However, the suction created above the valve in the sleeve, depending on the size of the hole 18, slows downward movement of the valve head 21. As water flows in through the hole 18 to above the valve head 21 it gradually allows the downward motion and closing of the valve head 21, and by the time the pressure is substantially equalized in the sleeve 14 the valve head is gradually but tightly closed. In the valve head shown in Fig. 4 the water passes through the clearance between the annular rib 32 and the inner periphery of the sleeve and slowly equalizes the pressure thereby allowing the lowering of the valve head upon the valve seat. The operation of this latter valve is somewhat quicker.

It was found in practice that a flush valve constructed in accordance with my invention, with minimum number of parts, operates easily, and does not clog up or otherwise remain open by reason of impurities or wear, consequently leakage is definitely avoided. The valve does not freeze or stick nor does it cause any hammering action in the line. It is cushioned in its operation, easier to operate, and eliminates the necessity for the separate relief valve for reducing head pressure above a piston, as well as eliminating the complicated diaphragm and piston valve mechanisms and the like used in the past.

I claim:

1. In a flush valve the combination with a valve body having an intake and an outlet and a valve seat between the intake and the outlet having an intake chamber around and above said valve seat, of a valve head seated on said valve seat, a stem extended from said valve head through said valve seat, a sleeve in said intake chamber around and extending below the level of said valve seat and in contact with the periphery of said valve, said valve being tiltable in said sleeve to allow passage of water through said valve seat, and a mechanism for tilting said valve at will, a packing ring on the outer periphery of said sleeve, and means to support and clamp said packing ring in said valve chamber for supporting said sleeve in position.

2. In a flush valve of the character described, the combination with a valve body having an inlet and an outlet and a valve seat between said inlet and outlet, a poppet valve seated on the valve seat, the stem of said poppet valve extended toward the outlet in said body, a sleeve supported around and extending below the level of said valve seat allowing communication from the outlet through said valve seat, said poppet valve tiltably fitting into said sleeve, and a device to engage said valve stem and tilt said valve off said valve seat, a packing ring around the outer periphery and spaced from the upper end of said sleeve, a threaded socket in said valve body in which said packing ring rests supporting said sleeve in spaced position around said valve seat, a cap, a threaded flange extending from the cap around said sleeve and threadedly secured in said body for clamping said packing ring in position and sealing the upper end of said sleeve.

LOUIS E. DERUETTE.

REFERENCES CITED

The following references are of record in the file of this patent:

UNITED STATES PATENTS

| Number | Name | Date |
| --- | --- | --- |
| 205,903 | Quinn | July 9, 1878 |
| 947,183 | Lewis | Jan. 18, 1910 |
| 1,987,843 | Svejda | Jan. 15, 1935 |
| 2,255,322 | Langdon | Sept. 9, 1941 |

FOREIGN PATENTS

| Number | Country | Date |
| --- | --- | --- |
| 721,984 | France | of 1931 |